(12) United States Patent
Braeuer (10) Patent No.: US 10,215,306 B2
(45) Date of Patent: Feb. 26, 2019

(54) VALVE CAGE FOR RECEIVING A VALVE MEMBER AND METHOD FOR OPERATING A CONTROL VALVE WITH A VALVE CAGE AND A VALVE MEMBER

(71) Applicant: Samson Aktiengesellschaft, Frankfurt am Main (DE)

(72) Inventor: Anke Braeuer, Erlensee (DE)

(73) Assignee: SAMSON AKTIENGESELLSCHAFT, Frankfurt (DE)

( * ) Notice: Subject to any disclaimer, the term of this patent is extended or adjusted under 35 U.S.C. 154(b) by 0 days.

(21) Appl. No.: 15/392,739

(22) Filed: Dec. 28, 2016

(65) Prior Publication Data

US 2017/0184219 A1 Jun. 29, 2017

(30) Foreign Application Priority Data

Dec. 29, 2015 (DE) .................. 10 2015 016 902

(51) Int. Cl.
 *F16K 47/08* (2006.01)
 *F16K 3/32* (2006.01)
 (Continued)

(52) U.S. Cl.
 CPC .............. *F16K 47/08* (2013.01); *F16K 3/32* (2013.01); *F16K 1/52* (2013.01); *F16K 39/04* (2013.01);
 (Continued)

(58) Field of Classification Search
 CPC . F16K 47/04; F16K 39/04; F16K 1/52; F16K 47/08; F16K 3/24; F16K 3/32; Y10T 137/86734; Y10T 137/2501
 (Continued)

(56) References Cited

U.S. PATENT DOCUMENTS 3,157,200 A * 11/1964 Rowan .................... F16K 39/04
 137/625.33
3,791,413 A * 2/1974 Muller .................... F16K 47/04
 137/625.3

(Continued)

FOREIGN PATENT DOCUMENTS

DE 2830609 A1 * 1/1980 ............. F16K 47/04
FR 2306390 A1 * 10/1976

(Continued)

*Primary Examiner* — Matthew W Jellett
*Assistant Examiner* — Christopher Ballman
(74) *Attorney, Agent, or Firm* — Schiff Hardin LLP (57) ABSTRACT

A sleeve shaped valve cage for receiving a valve member is described. The valve cage can guide the valve member relative to the valve cage. The valve cage can include a throttle section configured to provide pressure-reduced flow rates of the processing fluid, the throttle section having multiple throttle conduits extending from an inside of the valve cage to an outside of the valve cage; a high capacity flow section adjacent to the throttle section in the displacement direction, the high capacity flow section configured to provide increased flow rates of the processing fluid; and at least one equalization channel formed in the valve cage and extending from the inside to the outside of the valve cage, the at least one equalization channel leading from the high capacity flow section to the throttle section such that, before the valve member releases all throttle conduits, the equalization channel is released.

19 Claims, 3 Drawing Sheets (51) Int. Cl.
 *F16K 39/04* (2006.01)
 *F16K 1/52* (2006.01)
 *F16K 47/04* (2006.01)
(52) U.S. Cl.
 CPC ......... *F16K 47/04* (2013.01); *Y10T 137/2501* (2015.04); *Y10T 137/86734* (2015.04)
(58) Field of Classification Search
 USPC ...................................................... 137/625.3
 See application file for complete search history.

(56) References Cited

U.S. PATENT DOCUMENTS

| | | | |
|---|---|---|---|
| 4,384,592 A * | 5/1983 | Ng | F16K 3/34 137/625.3 |
| 4,479,509 A * | 10/1984 | Dear | F16K 47/02 137/375 |
| 4,705,071 A | 11/1987 | Connors, Jr. et al. | |
| 5,014,746 A | 5/1991 | Heymann | |
| 5,706,856 A * | 1/1998 | Lancaster | F16K 47/08 137/556.3 |
| 8,740,179 B2 * | 6/2014 | Griffin, Jr. | F16K 47/08 251/127 |
| 8,950,431 B2 * | 2/2015 | Kim | F16K 47/08 137/625.33 |
| 9,046,191 B2 * | 6/2015 | Davies | F16K 47/00 |
| 9,151,407 B2 * | 10/2015 | Fontaine | F16K 47/04 |
| 2002/0017327 A1 | 2/2002 | Kawaai et al. | |

FOREIGN PATENT DOCUMENTS

| | | |
|---|---|---|
| JP | H07103363 A | 4/1995 |
| WO | 2011118863 A1 | 9/2011 |
| WO | 2014070977 A1 | 5/2014 |

* cited by examiner

VALVE CAGE FOR RECEIVING A VALVE MEMBER AND METHOD FOR OPERATING A CONTROL VALVE WITH A VALVE CAGE AND A VALVE MEMBER

CROSS REFERENCE TO RELATED APPLICATIONS

This patent application claims priority to German Patent Application No. 102015016902.5, filed Dec. 29, 2015, which is incorporated herein by reference in its entirety.

BACKGROUND

The present disclosure relates to a sleeve shaped valve cage for receiving a valve member, such as a valve plug, of a control valve of a processing plant, such as a chemical plant, a foodstuff processing plant, a power generating plant, or the like. The present disclosure also relates to a method for operating a control valve of a processing plant comprising a valve cage and a valve member.

Typically, a valve cage is designed to guide the valve member in a displacement direction or motion direction relative to the valve cage between a closed position in which the valve member prevents a stream of process fluid through the control valve, and an open position in which the valve cage together with the valve member releases an opening area for a process fluid stream. The valve cage thereby provides different throttle characteristics or throttle quotas dependent on the displacement position of the valve member. The throttle characteristic can for example be depend on the flow resistance which the opening area of the valve cage released by the valve member exerts a stream of process fluid through the control valve.

When the valve member is arranged in the open position, usually the maximally available opening area or entire opening area of the valve cage is laid open by the valve member, so that the process fluid can flow through the total opening area of the valve cage. Within the valve cage, one or more openings can be provided which are increasingly released during the movement or displacement of the valve member from the closed position to the open position. The flow resistance which the valve member together with the valve cage exert upon the stream of process fluid depends inter alia from the size and shape of those openings which are released in a respective displacement position of the valve member.

Known valve cages traditionally have evenly distributed openings of uniform size. By rendering the valve member displaceably guided within such a classical valve cage, the available opening area of the valve cage can be released essentially proportionally with respect to the displacement of the valve member in the valve cage. Correspondingly the throttle characteristic then changes essentially proportional to the displacement of the valve member in the valve cage, and in case of a constant pressure upstream of the control valve, an increasingly growing mass stream of the fluid stream can flow through the control valve or the provided opening area.

It has been shown that it can be desirable, depending on the area of operation of the control valve to provide the control valve having a constantly high upstream pressure on the one hand with a first control section having a significant flow resistance or significant throttle characteristics, but on the other hand also to provide the control valve with a second control section of low flow resistance. Control valves with a traditional valve cage with evenly distributed openings of constant size, however, in particular at high process fluid pressures, always create a significant flow resistance pressure drop via the control valve.

As a further development of such traditional control valves, improved valve cages have been established which include both a throttle section for a pressure-reduced throughflow of the stream of process fluid which includes multiple throttle conduits extending from the inside of the valve cage to its outside, as well as a high capacity flow section adjacent to the throttle section in the displacement direction which includes equalization channels for large flow rates of the process fluid stream. Such valve cages are described in WO 2011/118863 A1 and WO 2014/070977 A1.

WO 2011/118863 A1 describes a valve cage with a throttle section in which first to third throttle conduits are arranged next to one another, each having an elongate cross-section angled relative to the axis of the valve cage. In the direction of the stream, i.e. radially with respect to the axis of the valve cage, the throttle conduits progress in a step-like or labyrinth-like manner, to thereby provide a pressure-reducing throttle effect. In the axial direction above the throttle section passage windows can be provided which allow a throughflow of large amounts of process fluid through the valve cage and therefore run step-free, rectilinearly in the radial direction through the wall of the valve cage. In the valve cage described in WO 2011/118863 A1, it was shown as disadvantageous that a dead band is present in the section between the axially topmost throttle conduit and the axially adjacent passage window, so that, when displacing the valve plug in the valve cage, in spite of a movement of the valve plug through the dead band, the flow rate of the process fluid stream does not change, which usually leads to over searing of the displacement of the valve plug.

This problem is addressed with the valve cage according to WO 2014/070977 A1. In this valve cage, a transition section is provided between the sound attenuating throttle section in which annular sleeve discs lying on top of each other are provided with radial throttle conduit openings, and an axially adjacent full throughflow section or high capacity flow section, which is formed by a bushing having multiple passage windows. In the transition section, transition openings are realized formed as cuts into the end faces of the passage window sleeve with which the passage window sleeve is set on top of the topmost sleeve disc of the throttle section, so that a dead band is avoided. However, the controllability of a control valve having a valve cage according to WO 2014/070977 A1 still turned out to be unsatisfactory.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Further features, characteristics and advantages of the disclosure will become apparent through the following description of a preferred embodiment of the disclosure on the basis of the enclosed drawings, in which is shown.

The exemplary embodiments of the present disclosure will be described with reference to the accompanying drawings.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

It is an objective of the present disclosure to overcome the disadvantages of the related art, and in particular, to provide a valve cage and an operating method for a control valve which allows both a significantly throttling operating condition as well as an operating condition for letting through unthrottled, large flow rates, wherein the controllability in particular when changing from the throttle-operation to the throughlet-operation, shall be improved in comparison to known solutions.

The exemplary embodiments of the present disclosure relate to a sleeve-shaped valve cage for receiving a valve member, such as a valve plug, of a control valve of a processing plant, such as a chemical plant, a foodstuff processing plant, a power generation plant, or the like. In an exemplary embodiment, the sleeve-shaped valve cage can have, for example, an essentially hollow cylindrical shape defining a cylinder- or sleeve-axis, as well as a direction radially with respect to the sleeve-axis and a circumferential direction relative to the sleeve-axis. For mounting the sleeve-shaped valve cage in a control valve, the sleeve-shaped valve cage can, in particular frontally (on the face side) of a cylinder sleeve-shaped section, include flange-like projecting sections. In an exemplary embodiment, the valve member, for example the valve plug, of the control valve is arranged displaceable within the sleeve-shaped valve cage. In an exemplary embodiment, this valve member has an outer circumference configured correspondingly to the inner circumference of the valve cage. In particular, the valve cage limits a cylindrical interior space having an inner diameter. The valve plug can in particular be cylindrical and solid or hollow cylindrical and has an outer circumference with an outer diameter corresponding to the inner diameter of the valve cage. In an exemplary embodiment, the valve cage interior diameter and the valve member exterior diameter are configured with respect to each other such that a clearance fit or sliding fit is realized to be free of wear or at least low-wear.

In an exemplary embodiment, the valve cage is configured to guide the valve member along the displacement direction between a closed position in which the valve member prevents a stream of process fluid through the control valve, and an open position in which the valve cage and the valve member together release an opening area for a stream of process fluid, and further configured to, dependent upon the control position or displacement position of the valve member, i.e. the momentary position of the valve member along the displacement direction, to provide different throttle characteristics.

In an exemplary embodiment, the sleeve-shaped valve cage comprises a throttle section for small (e.g., particularly pressure-reduced flow rates of) process fluid having several throttle conduits extending from an inside of the valve cage to its outside. In exemplary embodiments, the number of throttle conduits can be, for example (but not limited to) at least 10, at least 50, at least 100, at least 200, at least 400, at least 600, at least 800, or another quantity as would be understood by one of ordinary skill in the art. In an exemplary embodiment, the number of throttle conduits is less than 3000, less than 1500, less than 700, less than 500, less than 300, less than 150, or another quantity as would be understood by one of ordinary skill in the art. In an exemplary embodiment, a sleeve-shaped valve cage has, for example, between 300 and 3000 throttle conduits.

In an exemplary embodiment, the throttle section can be defined as the section of the sleeve-shaped valve cage extending in the axial direction between two throttle conduits which are most distanced from one another in the axial direction. In an exemplary embodiment, the throttle section thus extends from a very first throttle conduit in the displacement direction to a very last throttle conduit in the displacement direction. In particular, the throttle section is a cylindrical area of the valve cage which extends in the axial direction exactly so far that all throttle conduits of the valve cage are arranged within the throttle section, i.e. without the throttle section also comprising any axial sections of the valve cage which are completely free of throttle conduits. The throttle section thus extends in particular exclusively over that axial range of the valve cage in which all of the throttle conduits are arranged. In an exemplary embodiment, the sleeve-shaped valve cage can include the throttle conduits in its cylinder sleeve-shaped wall. In operation, to flow through the throttle conduits of the valve cage, the process fluid enters into the inner space of the valve cage. The inside of the valve cage thus defines an inlet surface for the process fluid stream. In an exemplary embodiment, this inlet surface for process fluid can be dimensioned such that it essentially corresponds to the cross-sectional area of the control valve inlet and/or of the control valve outlet. In an exemplary embodiment, the throttle conduits are dimensioned such that the cross-sectional area of one throttle conduit, in particular of each throttle conduit, is smaller than one-hundredth, than five-hundredth, than one-thousandth, than one five-thousandth or than one ten-thousandth of the inlet area. In this way, a significantly pressure-reduced throttle effect can be provided.

In an exemplary embodiment, the sleeve-shaped valve cage includes a, in particular essentially throttle-free, full throughflow section or high capacity flow section adjacent to the throttle section in the displacement direction for large flow rates of processing fluid, in particular with at least one passage window extending from the inside to the outside. In an exemplary embodiment, the openings arranged in the high capacity flow section are substantially larger than the throttle conduits so that the flow resistance of an orifice or an opening or of a passage window is significantly smaller than the flow resistance provided by a throttle conduit.

In an exemplary embodiment, in the valve cage, at least one equalization channel formed extending from the inside to the outside of the valve cage which leads from the high capacity flow section into the throttle section such that, before the valve member releases all throttle conduits, the equalization channel is already at least partially, particularly completely, released. For example, the covering and the release of the throttle conduits and of the equalization channel by the valve member can be configured by the kinematics and the structural cooperation of the valve cage and valve member such that in a transition position of the valve member for partially throttling, the equalization channel still remains at least partially open for a passage of the fluid, although the large high capacity flow section of the valve cage is already completely closed by the valve member. In an exemplary embodiment, after completely closing the high capacity flow section, all throttle conduits of the throttle section still remain released by the valve member, wherein in particular the same applies to the equalization channel. Even when the first (topmost) of the throttle conduits are closed by the valve member along its displacement path, the high capacity flow section remains closed, while the equalization channel may still be partially open for fluid throughflow and becomes continuously more closed during a continuous closing of the respective throttle conduits of the respective throttle section, by decreasing the passage cross-section depending on the degree of displacement of the valve member. Insofar, in an exemplary embodiment, the equalization channel having a relatively large passage cross-section already becomes opened while a portion of the throttle conduits remain closed. In an exemplary embodiment, less than 20% or 10% of throttle conduits of the throttle section remain closed (obstructed) by the valve member.

In particular, the at least one equalization channel extends from at least one passage window along the axial direction or displacement direction into the throttle section so that at least one radial cross-sectional area arranged perpendicular to the sleeve axis intersects at least one or several of the throttle conduits as well as the at least one equalization channel.

In an exemplary embodiment, the at least one equalization channel provides that, while displacing the control member from the closed position in the direction of the open position, not only that a dead band between the throttle section and the high capacity flow section is avoided, but furthermore that the throttle characteristic or throttle rate behaves harmonically dependent on the control position or displacement position, in a continuously and strictly monotonously increasing manner. In this way it is ascertained that, dependent on the displacement position of the valve member, a continuously adjustable volume stream through the valve cage and the control valve can be realized which allows for a particularly stable control of the control valve throughflow. In exemplary embodiments, a stepwise and/or sudden change of the volume stream during a continuous change of the control of the displacement position is avoided by the valve cage.

Those skilled in the relevant arts typically opine that a strict separation between a throttle section and a high capacity flow section is absolutely necessary to provide a throttle section in which a valve cage has a significantly pressure-reducing throttling effect. Contrary to this belief, as described in the exemplary embodiments of the present disclosure, the inventors have found that equalization channel extending into the throttle section configured and dimensioned according to the exemplary embodiments can enable a significantly improved controllability without any relevant impairment of the throttle effect.

In an exemplary embodiment, when the valve member is in the open position, a largest possible opening area or orifice area or complete opening area of the valve cage and the valve member received therein is provided. The valve cage has openings which, dependent on the displacement position of the valve member provide a partial opening area. The released or provided partial open area depends on the geometry of the valve cage and possibly that of the valve member. In an exemplary embodiment, the complete opening area corresponds to the sum of the cross-sectional areas of all of the openings extending through the valve cage sleeve in the radial direction, through which the process fluid can stream from an upstream entry of the control valve to a downstream exit of the control valve. Thereby, the valve cage can comprise a multitude of openings of different configurations, such as for example size, shape, arrangement in the valve cage along the displacement direction, etc. Thus, dependent on the displacement position of the valve member along the displacement direction, differently many, differently large and/or differently shaped throughflow openings are released by the valve member, which together define a combined or a common partial opening area upon which the flow resistance of the valve cage depends. Possibly, the flow resistance can also depend upon the pathway of the opening in the radial direction through the valve cage sleeve. The released complete or partial opening area determines the pressure-reduction of the process fluid pressure upstream of the valve cage to the process fluid pressure downstream of the valve cage, wherein it should be clear that, asides from the shape of the valve cage, also the attributes of the process fluid, particularly its density, viscosity, pressure, etc. have an influence on the pressure reduction in the valve cage.

In an exemplary embodiment, the throttle characteristic can be defined as the ratio of the volume stream of the process fluid through the valve cage depending on the percentage-wise displacement position of the valve member between the closed position and the open position under the assumption of otherwise constant and boundary conditions, in particular regarding the attributes of the process fluid. In an exemplary embodiment, this throttle characteristic develops, dependent on the displacement position, in particular continuously increasing, monotonously increasing, strictly monotonously increasing. In particular, the throttle characteristic runs without any volume stream plateau, which might extend between two displacement positions or rather along a displacement path, in which, in spite of a change of the valve member displacement position, no change of the volume stream occurs. In an exemplary embodiment, the displacement position-dependent throttle characteristic runs so continuously that a deadband-free volume stream curve is provided, having a first and/or second derivative which is also continuous and/or monotonous.

In an exemplary embodiment of the present disclosure, the valve cage comprises a rectangular passage window, which is in particular arranged outside of the throttle section, for the large amounts of throughflow, in particular comprising rounded corners. Such passage windows display good streaming features and are easy to manufacture. In an exemplary embodiment, the passage window is arranged in the displacement direction beyond the last throttle conduit. For example, a passage window can extend in the axial direction at least, for example, 5-times, as far as one throttle conduit. In an exemplary embodiment, the passage window can extend in the axial direction 15- to 20-times as far as one throttle conduit.

In an exemplary embodiment, a passage window can in a circumferential direction extend at least, for example, 10- or 20-times, in particular 20- to 30-times, as far as one throttle conduit. In an exemplary embodiment, the entire cross-sectional area of that part of the equalization channels extending into the throttle section measures between 2% and 30%, in particular between 4% and 22%, of the entire cross-sectional area of the throttle conduits.

In an exemplary embodiment, the throughflow cross-sectional area of one passage window is at least, for example, 10-times as large as the cross-sectional area of one throttle conduit. In an exemplary embodiment, the throughflow cross-sectional area of one passage window is at least 100-times as large as the cross-sectional area of one throttle conduit. In an exemplary embodiment, the area of one passage window is at least 200-times as large, in particular between 300-times and 500-times as large as the cross-sectional area of one throttle conduit.

In an exemplary embodiment, the throttle body can comprise exactly one passage window, at least one passage window or several passage windows (e.g., 5 to 50, 6 to 30, or 6 to 12 passage windows). In an exemplary embodiment, the entire opening area of one passage window or of the multiple passage windows amounts to at least, for example, 5%, in particular at least 30%. In an exemplary embodiment, the entire opening area of one passage window or of the multiple passage windows amounts to more than, for example, 50% or 70% to 80% of the inlet area. The entire opening area of one passage window or of the multiple passage windows can amount to, or no more than 100%, in particular not more than 30%, of the inlet area.

In an exemplary embodiment, the opening area of the passage window or of the passage windows is at least as large, approximately twice as large or at least 5-times as large as the entire combined cross-sectional area of the throttle conduits. In an exemplary embodiment, the axial height of the at least one rectangular passage window by itself amounts to 22% to 40% of the combined axial height of the at least one rectangular passage window and the corresponding equalization channel.

In an exemplary embodiment, the cross-sectional area of the part of the equalization channel extending into the throttle section amounts to less than a half, less than a third, between 5% and 20%, or less than 5%, in particular less than 1%, of the entire, common or combined cross-sectional area of the one equalization channel and the at least one passage window (e.g., of the equalization channel leading into the respective passage window). In this way it is ascertained that the main part of the passage window is arranged beyond the throttle section, such that the pressure-reducing effect of the throttle section is, if at all, at most slightly impaired by the equalization channel. In an exemplary embodiment of the sleeve-shaped valve cage, the cross-sectional area of the part of the equalization channel extending into the throttle section amounts to between 2% and 25%, in particular between 5% and 17% of the entire, combined cross-sectional area of an equalization channel and a passage window associated to one another.

In an exemplary embodiment of the valve cage, the at least one equalization channel leads into the passage window with a rounded transition section. Through the rounded transition area, local pressure peaks of the process fluid when streaming through the valve cage are avoided so that noise development and wear can be reduced.

An exemplary embodiment of a valve cage with more than one equalization channel can comprise, for example, at least one passage window having no equalization channel. In an exemplary embodiment, the at least one passage window comprises exactly one equalization channel. In an exemplary embodiment, each passage window comprises at least one, in particular exactly one equalization channel.

In an exemplary embodiment of a sleeve-shaped valve cage, the at least one equalization channel forms a concave, in particular hyperbolic or parabolic, cavity cross-section in the valve cage in the displacement direction. A concave, for instance hyperbolic or parabolic cross-section causes that, when displacing the control member relative to the valve cage, the cross-sectional area of the equalization channel, which is increasingly released by the valve member, grows both in the displacement direction as well as across from the displacement direction which leads to a harmonic transition between the throughflow section and the high capacity section.

In an exemplary embodiment, the at least one equalization channel extends in the displacement direction over, for example, at least 1%, at least 5%, at least 10%, at least 15%, at least 25%, at least 50%, at least 75%, at least 90% and/or over at most 95%, at most 50%, at most 30%, or at most 10% of the throttle section. Alternatively, the at least one equalization channel can extend over the entire throttle section. That is, from the first (in displacement direction) to the last (in displacement direction) throttle conduit. In an exemplary embodiment, an extension far into the throttle section can be used to allow for a continuous, particularly harmonic superposition of volume stream through the throttle channels and the equalization channel.

It has been shown that even an equalization channel just slightly leading into the throttle section essentially is sufficient to provide for an improved controllability during the transition of the valve member from a throttle section into the high capacity flow section or vice versa. In a sleeve-shaped valve cage with several equalization conduits it shall be clear that all equalization channels extend equally far. However, it is also imaginable that, in case of several equalization channels, different lengths of extension of the individual equalization channels are provided. In particular, each equalization channel of a valve cage can extend differently far into the throttle section.

In an exemplary embodiment of a valve cage, the throttle conduits and the passage windows or the throttle section and the throughlet section (or high capacity flow section) define an opening section extending in the axial direction of the valve cage. In an exemplary embodiment, the equalization channel begins above at least 30% and/or 63%, more specifically, at about 50% of the axial height of the opening section. In an exemplary embodiment, the high capacity flow section begins above at least 51% and/or at most 83%, more specifically at 65% to 75%, in particular at 73% or 67% of the axial height of the opening section.

In an exemplary embodiment of a sleeve-shaped valve cage, the several throttle conduits each define a round, circular, cross-sectional area. In particular drilled holes or bores through the valve cage realize the throttle conduits. In an exemplary embodiment, the throttle conduits can be configured such that the length of a throttle conduit in the radial direction of the valve cage sleeve is larger than, at least 2-times larger, 5-times as large as or 0-times as large as, in comparison to the diameter of the respective throttle conduit, in particular, however, at most 6.5-times as large as it. In an exemplary embodiment, the length of one throttle conduit is between 2.250- and 6.375-times as large as the diameter thereof.

In an exemplary embodiment, the valve cage in the throttle section comprises throttle conduits of different shapes or sizes, wherein in particular the size of the opening areas of different throttle conduits increases in the displacement direction towards the high capacity flow section.

Alternatively, all throttle conduits can have the same cross-section and/or the same shape for simplifying the sleeve's manufacturing.

In an exemplary embodiment, the valve cage is formed integrally and/or consists of only one piece. An integrally formed embodiment of a valve cage decreases the susceptibility of the valve cage to such vibrations as can occur during the streaming of process fluid through the valve cage. In this way, the noise emissions and the wear of the valve cage can be decreased.

The present disclosure also relates to a control valve for a processing plant, such as a chemical plant, a foodstuff processing plant, a power generation plant, or the like, which comprises a valve cage according to the exemplary embodiments as described herein, and a valve member received within the valve cage, such as a valve plug.

The disclosure further relates to a method for operating a control valve of a processing plant, such as a chemical plant, a foodstuff processing plant, a power generating plant or the like, wherein the control valve comprises a valve cage and a valve member, such as a valve plug.

In an exemplary embodiment, in the operating method, the valve member is displaced or rather driven from a closed position where the valve member prevents that the process fluid streams through the control valve into an open position where the valve cage and the valve member together release an opening area for the stream of process fluid in relation to the valve cage for setting and/or controlling a stream of process fluid. In an exemplary embodiment, the displacement of the valve member occurs guided in and guided by the valve cage.

When displacing the valve member from the closed position in the direction towards the open position, the valve member first releases a throttle section of the valve cage, to allow small, in particular pressure-reduced flow rates of the process fluid through several throttle conduits. Such a throttled stream of process fluid of small flow rate displays a significantly lower pressure downstream of the valve cage than upstream of the valve cage, wherein throttle conduits in the throttle section secure that no large noise emission goes along with the change of the attributes of the process fluid stream. Throttling valve cages can therefore also be referred to as mufflers, sound attenuating or sound absorption devices.

In an exemplary embodiment, in the operating method, after the throttle section is released by the valve member, a high capacity flow section of the valve cage is released for a large flow rate of process fluid through the valve cage. For essentially constant process parameters upstream of the valve cage, for example relating to pressure, temperature, viscosity and/or density of the process fluid, it can be achieved by releasing a high capacity flow section in addition to the throttle section that a large amount of the processing fluid can flow essentially unhindered through the valve cage through the high capacity flow section thereof, or merely with a flow resistance which is at least one or even more magnitudes smaller than the flow resistance that can be generated by the throttle section.

In an exemplary embodiment, during the operating method, a equalization channel is released, which extends from the throttle section into the high capacity flow section, before all throttle conduits have been released by the valve member. The release of this throttle section allows for a continuous change of volume flow in dependence of the change of the displacement position of the valve member relative to the valve cage. Such an operating method for a control valve allows to switch between a throttling effect and a high capacity flow effect (having little to no throttling effect) of a control valve, without any control difficulties arising at the transition between the throttle operation and the throughlet operation.

In an exemplary embodiment, when displacing the valve member from the closed position into the open position, the volume stream or flow rate of the process fluid stream will be, dependent on the displacement position of the valve member, continuously and strictly monotonously increased.

In an exemplary embodiment, the operating method performs according to the functions of the above-mentioned valve cage or of the above-mentioned control valve. It shall be clear that the above-mentioned throttling body or control valve can be configured such that it acts according to the exemplary embodiments of the present disclosure.

In an exemplary embodiment, the $K_V$-value or high capacity flow coefficient or throughlet coefficient through the openings of the valve cage is configured such that, in case of a fully opened valve member, 47% to 76% of the process fluid flow through the passage window, 15% to 28% of the process fluid flow through the equalization channels and 5% to 25% of the process fluid flow through the throttle conduits.

Figure 1:
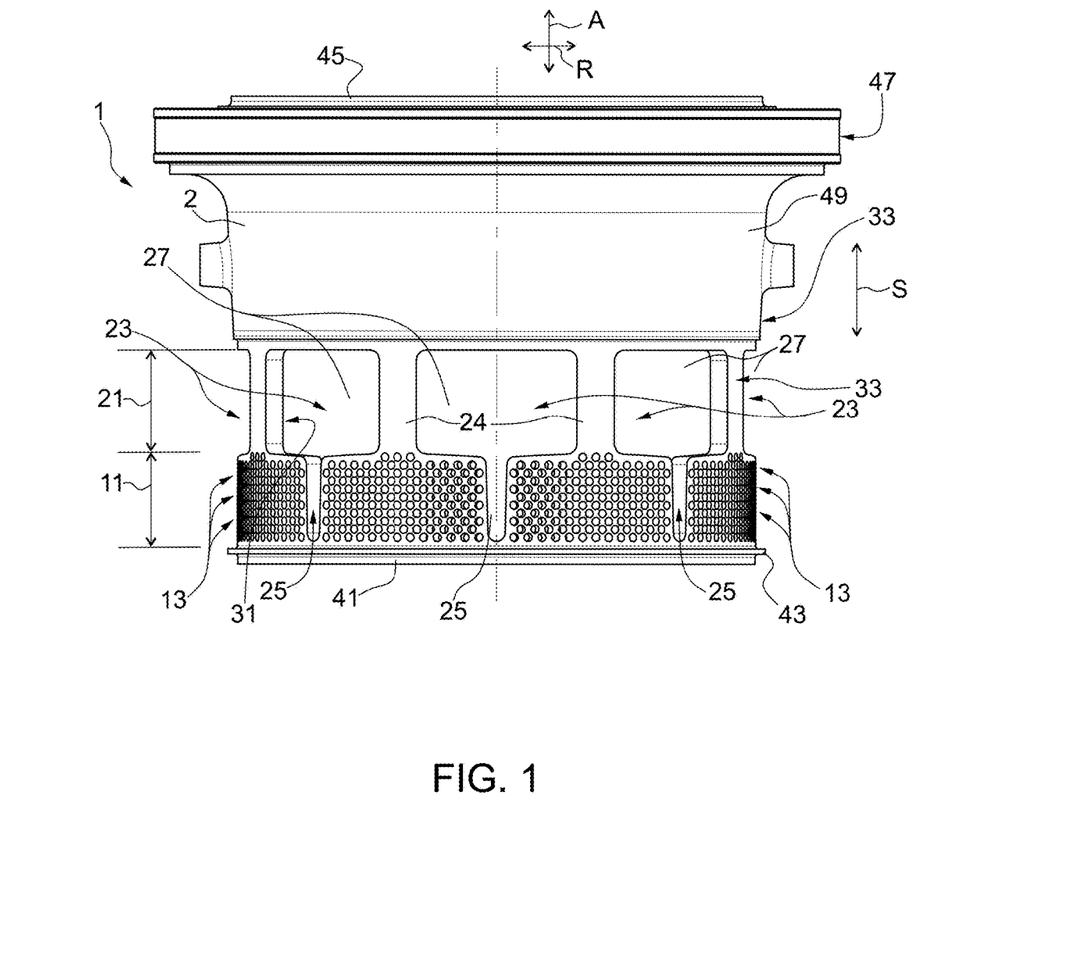
FIG. 1 illustrates a side view of a first valve cage according to an exemplary aspect of the present disclosure.
Figure 2:
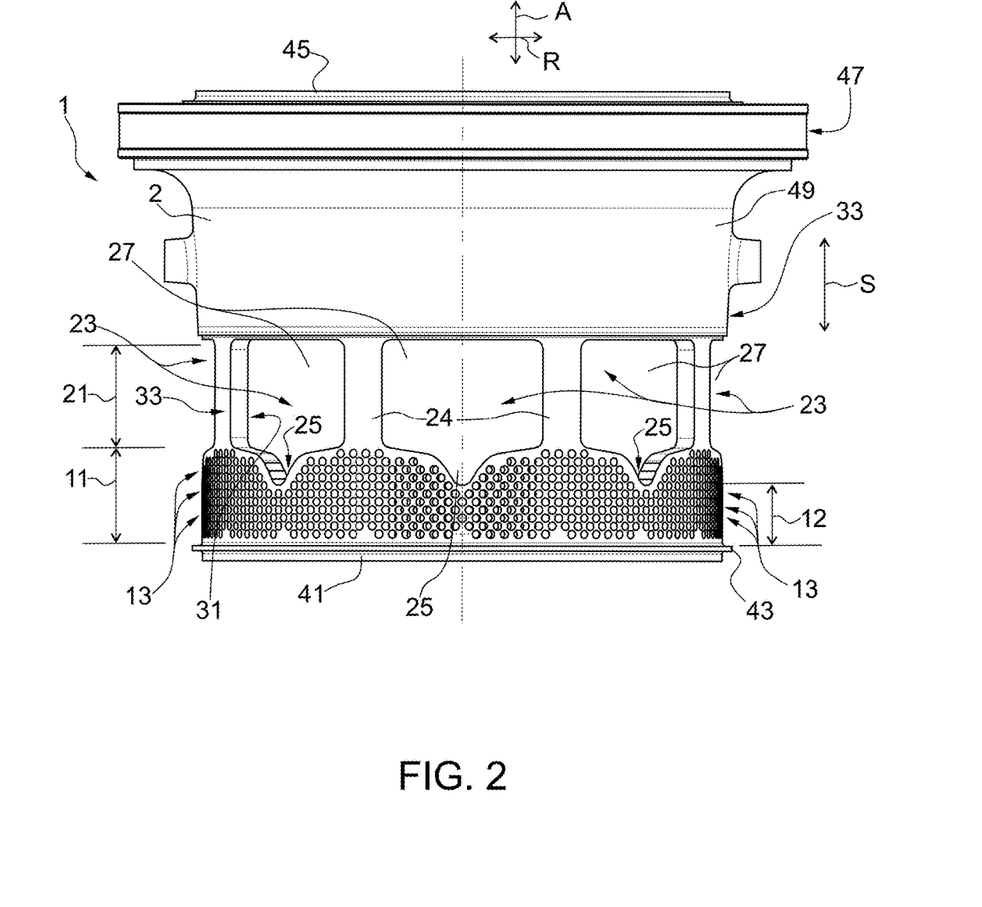
FIG. 2 illustrates a side view of a second valve cage according to an exemplary aspect of the present disclosure.
Figure 3:
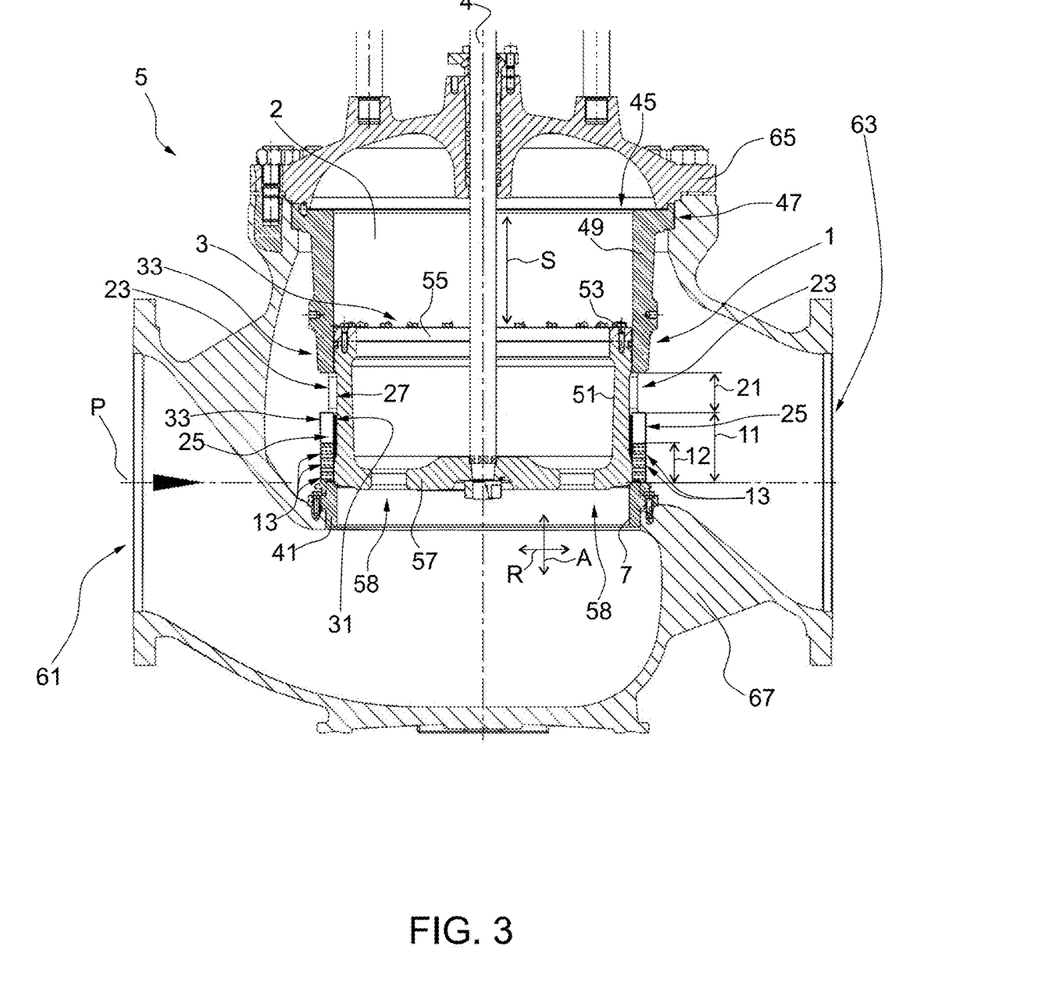
FIG. 3 illustrates a cross-sectional view of a control valve having a valve cage with a valve plug guided therein according to an exemplary aspect of the present disclosure.

In FIGS. 1 to 3, exemplary embodiments of a valve cage according to the present disclosure are generally designated with reference numeral 1. In an exemplary embodiment, as main components, the valve cage 1 comprises a throttle section 11 and a throughlet or high capacity flow section 21, wherein in the two sections 11, 21, differently large openings or orifices are provided through which the process fluid may stream, so that, dependent on how many and which openings are released, different throttle characteristics are provided.

In an exemplary embodiment, the valve cage according to FIG. 1 includes an integrally manufactured cage sleeve having a hollow cylindrical cross-section. The cage sleeve 2 defines with its hollow cylindrical shape an axial direction A as well as radial directions R perpendicular to the axial direction. The valve cage 1 is configured so that a stream of process fluid can stream into the valve cage 1 through an axially frontal inlet cross-section (not illustrated in FIG. 1) and flow through openings in the cage sleeve 2 in different radial directions R through the cage sleeve of the valve cage 1.

The inlet of the valve cage according to FIG. 1 is arranged at the first axial end of the valve cage, the lowermost end face 41 shown at the bottom (relative to the drawings) in the axial direction A. At the end face 41 of the valve cage, a flange edge 43 is provided, with which the valve cage 1 can be sealingly mounted to a valve housing (not shown). The annular flange 43 of the valve cage 1 can be arranged sealingly engaging on the top side of an annular valve seat (not illustrated) in, for example, a mounting condition of the valve cage 1.

On the opposite second front face or face side 45 of the valve cage, which is shown in the top in the figures, the valve cage 1 comprises a protruding ring flange 47 which can be held between a cage seat of a valve housing and a valve housing lid (not illustrated). The ring flange 47 protruding at the upper face end 45 of the valve cage 1 can transition into a closed wall section via a rounded transition section.

The closed wall section 49 extends over approximately half of the axial extension of the valve cage 1 and comprises no openings between the inside 31 and the outside 33 of the valve cage 1. In the wall section 49, the cage sleeve 2 is thus operatively always fluid tight. The wall section 49 of the valve cage is shaped nearly ideally hollow cylindrically and may, due to manufacturing, have a slightly conically draft angle. Between the wall section 49 and the lower annular flange 43, the valve cage 1 comprises an equalization section 21 and a throttle section 11 which will be explained in detail below.

Adjacent to the wall section 49 of the cage sleeve 2, large passage windows or throughlet windows 27 are embedded in the cage sleeve 2, which extend from the radial inside 31 to the radial outside 33 of the cage sleeve 2, thereby providing a window-like equalization opening through the valve cage 1. The valve cage 1 according to the exemplary embodiment illustrated in FIG. 1 has eight such throughlet or passage windows 27. The throughlet or passage windows 27 can be arranged evenly and distributed in the circumferential direction along the circumference of the cage sleeve 2. Between the passage windows 27, support columns 24 extend in axial direction, for holding the holding forces with which the valve cage is braced between the valve housing lid and the valve seat (not illustrated). Due to the side view, only the four frontal support columns 24 are visible and conceal the view onto the reward four; also only five of the eight passage windows 27 are discernable.

In an exemplary embodiment, the cross-sectional area or opening area of the passage windows 27 is essentially rectangular having rounded corners and extends in circumferential direction over about 45° of the cage sleeve 2 and in the axial direction A over approximately one half of the opening section, where openings through the valve cage 1 are provided in the radial direction. In an exemplary embodiment, the large passage windows 27 allow for a stream of process fluid through the valve cage causing a nearly negligible small flow resistance of the valve cage 1 on the stream of process fluid because the passage windows 27 have a cross-sectional area larger than half of the front side inlet area the valve cage 1. The axial section in which the large passage windows 27 extend through the cage sleeve 2 of the valve cage 1 can be designated as a full flow section or high capacity flow section 21.

In an exemplary embodiment, adjacent to the equalization section 21, the valve cage 1 comprises a throttle section 11 extending in the axial direction from the axially lower most throttle conduit 13 to the axially topmost throttle conduit 13. In an exemplary embodiment, in this throttle section 11, several (e.g., dozens to hundreds, possibly even thousands) throttle conduits 13 are arranged. In an exemplary embodiment, the throttle conduits 13 are essentially evenly distributed across the throttle section 11.

In an exemplary embodiment, according to FIG. 1, the throttle conduits 13 are realized as bores extending from the inside 31 to the outside 33 of this cage sleeve 2, having an essentially constant, circular cross-section. In an exemplary embodiment, the throttle conduits 13 all have the same shape and size, but are not limited thereto and can have different shapes and/or sizes. In relation to the wall thickness of the throttle sleeve 2 (i.e., in relation to the radial distance from the inside 31 and the outside 33 of the throttle sleeve 2), the cross-section of each throttle conduit is significantly smaller. For example, the diameter of a throttle conduit 13 can measure less than one half, or more specifically less than a third of its length.

In an exemplary embodiment, the throttle conduits 13 have a much smaller cross-sectional area than the passage window 27 so that within the throttle conduits 13, a significant pressure loss occurs due to the inlet- and/or outlet-effects and/or through wall friction. This pressure- and/or flow velocity-reducing function of the throttle conduits 13 governs the operative behavior of the valve cage 1 having a partially or just completely released throttle section 11 (throttle operation). The throttle section 11 extends in the axial direction A exactly over the section in which channels or openings through the valve sleeve 2 are provided by the throttle conduits 13. In an exemplary embodiment, in the throttle section 11, the throttle conduits 13 are arranged such that in the axial direction A no valve cage annular section is free of throttle conduits 13 so that no dead band exists within the throttle section 11. That is, in case any radial cross-section is considered which stands perpendicular onto the axial direction A of the valve cage 1, any arbitrary radial cross-section within the throttle section 11 at any arbitrary axial position is occupied by at least one throttle conduit 13.

In an exemplary embodiment, starting from the passage window 27, one respective equalization channel 25 extends into the throttle section 11 forming an equalization groove or equalization trench. In an exemplary embodiment, the equalization groove or equalization trench which may have a parabolic or hyperbolic cross-sectional appearance, but are not limited thereto. The trench end of which can have a rounded transition section leading into the rectangular passage window 27. In an exemplary embodiment, the passage window 27 forms, together with the equalization channel 25, a common or combined complete cross-sectional area 23. The trench-shaped equalization channel 25 allows a harmonic transition from the throttle section 11 (throttle operation) into the equalization section 21 (throughlet operation).

In an exemplary embodiment, the equalization channel 25 extends over the entire axial length of the throttle section 11. The cross-sectional area 23 is almost completely provided by the cross-sectional area of the passage window 27. The equalization channel 25 forms, in relation to the passage window 27, merely a minor part of the entire cross-sectional area of the complete cross-section 23. The passage windows 27 provide the function of the high capacity flow section 21, in order to allow a stream of process fluid through the wall of the cage sleeve 2 from its inside 21 to its outside 23 without exerting any significant throttle effect onto the stream of process fluid (throughlet operation). The equalization channel 25 provides for a harmonic immediate transition from the throttle section 11 to the high capacity flow section 21 without any dead band therebetween.

In an exemplary embodiment, the width of an equalization channel 25 can be larger than the width of the throttle conduit 13 in the circumferential direction, particularly essentially over the entire axial length of the equalization channel 25. In an exemplary embodiment, the width of an equalization channel 25 can be larger than the width of the throttle conduit 13 in the circumferential direction, particularly essentially over at least 75% of the entire axial length of the equalization channel 25.

In an exemplary embodiment, the far end of the equalization channel 25 in relation to the passage window 27, can be, for example, rounded such that the radius of the equalization channel 25 is larger than the diameter of the cross-section of adjacent throttle conduits 13, but is not limited thereto. In an exemplary embodiment, the walls of the equalization channels 25 which extend in the axial direction A, extend nearly in parallel. In an exemplary embodiment, the walls of the equalization channels 25 which extend in the axial direction A with an angle of less than 5% with respect to the axial direction A of the valve cage.

FIG. 2 illustrates the valve cage 1 according to another exemplary embodiment of the present disclosure. For brevity, discussion of similar components between FIG. 1 and FIG. 2 may have been omitted. In an exemplary embodiment, the valve cage 1 as illustrated in FIG. 2 includes equalization channels 25 having a different shape than the channels 25 illustrated in FIG. 1.

In an exemplary embodiment, the equalization channel 25 illustrated in FIG. 2 extends in the valve cage 1 over approximately, for example, one third of the axial extension of the throttle section 11, but is not limited thereto. In an exemplary embodiment, the far end of the equalization channel 25 in relation to the passage window 27 has a rounding with a radius of approximately 1.5-times of the diameter of the diameter of an adjacent throttle conduit 13. In an exemplary embodiment, the cross-sectional shape of the equalization channel 25 is essentially wedge-shaped or V-shaped with a side wall angled with respect to the axial direction A in about 60°, tapering in the direction of the equalization window 27. The transition of the wall of the equalization channel 25 to the passage window is formed in a rounded manner.

In an exemplary embodiment, different from the embodiments illustrated in FIG. 1, the valve cage 1 according to FIG. 2 provides pure or absolute throttling section 12 over more than half the throttle section 11 in which exclusively throttle conduits 13 are arranged; and a mixed throttle section 11 in which throttle conduits 13 as well as equalization channels 25 are arranged; and a high capacity flow section 21 in which no throttle conduit but instead passage windows 27 are arranged. In comparison to the valve cage 1 according to FIG. 1, the valve cage 1 according to FIG. 2 has a strong throttle characteristic in the pure throttle section 12 in comparison to a comparable axial width of the throttle section 11 according to FIG. 1 in which already additionally to the throttle conduits 13 an equalization channel 25 of a larger cross-sectional area is provided. Although not illustrated, in an exemplary embodiment, the valve cage 1 can include a combination of one or more channels 25 as illustrated in FIG. 1 and one or more channels 25 as illustrated in FIG. 2. For example, the designs of the channels 25 for the valve cage 1 could alternate between the embodiments illustrated in FIG. 1 and FIG. 2.

FIG. 3 illustrates a schematic cross-sectional view of a control valve 5 according to an exemplary embodiment. The control 5 can include the valve cage 1 according to FIG. 1 or FIG. 2, or a valve cage combining embodiments from both FIG. 1 and FIG. 2. The control valve 5 can also include a valve plug 3 guided within the valve plug 3.

The valve plug 3 is in FIG. 3 arranged in a closed position in which no process fluid can stream through the valve cage 1, so that with the control valve 5 no process fluid flows through the control valve 5.

In the mounted situation illustrated in FIG. 3, the cage sleeve 2 sits between a valve seat 7 and a valve housing lid 65, wherein the valve housing lid 65 and the valve seat 7 are carried by the valve housing 67. At the contact surfaces between the valve housing 67, valve seat 7, cage sleeve 2 and/or valve housing lid 65, seals are provided.

In an exemplary embodiment, the valve plug 3 has a sleeve shape with an outside corresponding to the inside 31 of the valve cage 1. The valve plug 3 can be translationally moved in the axial direction A or a displacement direction S parallel to the axial direction A in order to release the passage section valve cage 1, formed by the throttle section 11 and the equalization section 21. To this end, the valve plug 3 is connected to a valve rod 4 which is actuated by a positioning actuator of the control valve 5 (not illustrated).

In an exemplary embodiment, according to FIG. 3, the valve plug 3 is arranged in its lowermost position in the displacement direction S and in a sealing engagement with the annular valve seat 7. In an exemplary embodiment, the valve plug 3 has, for example, a hollow cylindrical U-shaped cross-section, wherein the circumferential walls 51 on the outside sealingly cooperate with the inside 31 of the valve cage 1 and the valve seat 7, but is not limited thereto. In an exemplary embodiment, on the upper end of the U-shaped cross-section or rather the circumferential wall 51 as shown in FIG. 3, a sealing ring 53 is provided which is held stationary on the circumferential wall 51 by a holding ring 55. A sealing ring 53 and the sealing engagement of the valve plug 3 with the valve seat 7 causes in the illustrated closed position the prevention of a stream of process fluid through the control valve 5.

By operating the valve rod 4 via the (not illustrated) drive, the valve plug 3 is translationally moved in the displacement direction S of the closed position (in FIG. 3 upwards). The lower, radially, from the valve rod 4 to the circumferential wall 51 extending, plate-shaped plate sections 57 of the U-shaped valve plug 3, pressure equalization openings 58 are provided, so that the positioning actuator or drive (not illustrated) does, in case of change of the control or displacement position of the valve plug 3 in the displacement direction S has to overcome no or only very small resistances due to the pressure of the process fluid. In an exemplary embodiment, pressure equalization openings 58 do not realize openings allowing a stream of process fluid from the inlet 61 to the outlet 63 of the control valve 5.

In an exemplary embodiment, the valve plug 3 can be displaced in the displacement direction S so far (in FIG. 3 upwardly) that the entire axial length of the valve plug 3, that is, of its circumferential walls 51, are arranged in the wall section 49 of the valve cage 1 (not illustrated). In this position of the valve plug 3, all passage openings through the cage sleeve in the radial direction R are released by the valve plug 3, so that a large flow rate of process fluid can flow through all radial openings of the valve cage 1 (throughlet operation). This opened position of the valve plug 3 is not illustrated.

In an exemplary embodiment, when moving the valve plug 3 in the displacement direction S starting from the closed position, as shown in FIG. 3, in the direction of the (not illustrated) open position, at first the pure throttle section 12 of the valve cage 1 is continuously released (throttle operation). While releasing the pure throttling section 12, a common or combined opening area of the valve cage 1 with the valve plug 3 is provided through which process fluid can flow from the inlet 61 to the outlet 63 of the control valve 5. Due to the throttle effect of the throttle conduits 13, the process fluid thereby experiences a significant throttle effect or significant pressure-reduction; the pressure of the process fluid at the entrance 61 of the control valve 5 is significantly higher than the pressure of the process fluid at the exit 66 of the control valve 5. It shall be clear that the description relates to such flow situations, in which the process fluid at the entrance 61 flows in the direction of the arrow P towards the exit 63. However, it is imaginable that the process fluid flow direction is the other direction, opposite to the direction of the arrow P.

At the upstream face side 41 in the flow direction P of the valve cage 1, the valve cage 1 provides an inlet area for process fluid which is surrounded by the inside 31 of the valve cage 1. In the completely opened state of the control valve, when the valve plug 3 is arranged completely in the wall section 49 of the valve cage 1, the stream of the process fluid completely flows in the axial direction A through this inlet cross-section and afterwards in the radial direction R through the throttle section 11 and/or the equalization section 21 of the valve cage 1.

The further the valve plug 3 is moved from the closed position as indicated in FIG. 3, the more throttle conduits 13 are released so that the flow resistance which the valve cage 1 exerts upon the stream of process fluid cumulatively sinks depending upon the displacement position of the valve plug 3. Thereby, at first only small flow rates are allowed. After the valve plug 3 has been moved in the axial direction along the entire pure throttle section, the valve plug 3 begins to move into that part of the throttle section 11 in which equalization channels 25 extended. Since the cross-sectional channel area of the groove-shaped equalization channel 25 is dimensioned very small in relation to the much larger passage windows 27 and also small in relation to the inlet cross-section, the equalization channel 25 initially does practically not impair the throttle effect in the throttle section and later on slightly. The flow rate of the process fluid is, in the throttle operation of the control valve, therefore significantly smaller than in the throughlet operation with particularly completely released passage windows 27.

The further the valve plug 3 moves towards the open position, the larger the released cross-sectional area of the equalization channel 25 released by the throttle plug 3 becomes. Simultaneously, since the valve plug 3 is still in the throttle section 11 of the valve cage 1, more and more throttle conduits 13 are released (throttle operation).

When the valve plug 3 is positioned in the (in FIG. 3 upper) terminal rim or border of the throttle section 11, that is, at the position furthest from the upstream face 41 where at least one throttle conduit 13 is arranged, at least one equalization channel 45 is also already released by the valve plug 3. When the valve plug 3 then leaves the throttle section 11 and enters into the high capacity flow section 21, this takes place without the valve plug having to move through a dead band, in which in spite of movements of the valve plug no change of the volume stream through the control valve 5 would occur. Thanks to the equalization channel 25, a continuous change of volume stream occurs during the transition of the valve plug 3 out of the throttle section 11 (throttle operation) into the equalization section 21 (throughlet operation) without bent-, step- or jump-like change of the flow rate or volume stream.

When the valve plug 3 is moved further into the high capacity flow section towards the open position, the large cross-section of the passage window 27 is increasingly released until the valve plug 3 reaches the open position and all channels of the control valves are completely released and opened. This allows for very large flow rates.

Vice versa, the operating method for closing the valve 5 is performed correspondingly by continuously decreasing the opening area and flow rate.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

REFERENCE LIST 1 valve cage
2 cage sleeve
3 valve plug
4 valve rod
5 control valve
7 valve seat
11 throttle section
12 pure or absolute throttling section
13 throttle conduit
21 throughlet or high capacity flow section
23 complete cross-sectional area
24 support column
25 equalization channel
27 passage window
31 inside
33 outside
41, 45 end face
43 flange edge
47 ring flange
49 wall section
51 circumferential wall
53 sealing ring
55 holding ring
57 plate section
58 pressure equalization opening
61 inlet
63 outlet
65 housing lid
67 valve housing
A axial direction
P flow direction
R radial direction
S displacement direction

The invention claimed is:

1. A sleeve shaped valve cage for receiving a valve member, the valve cage being adapted to guide the valve member relative to the valve cage in a displacement direction between a closed position in which the valve member prevents a stream of processing fluid through the control valve and an open position in which the valve cage together with the valve member releases an opening area for a stream of processing fluid and further adapted to provide different reducing characteristics based on the control position of the valve member, the valve cage comprising:
- a throttle section configured to provide pressure-reduced flow rates of the processing fluid, the throttle section having multiple throttle conduits extending from an inside of the valve cage to an outside of the valve cage, wherein the throttle conduits are exclusively comprised within the throttle section;
- a high capacity flow section adjacent to the throttle section in the displacement direction, the high capacity flow section configured to provide increased flow rates of the processing fluid; and
- at least one equalization channel formed in the valve cage and extending from the inside to the outside of the valve cage, the at least one equalization channel leading from the high capacity flow section to the throttle section such that, before the valve member releases all throttle conduits, the equalization channel is released, wherein the at least one equalization channel extends between at least two adjacent throttle conduits of the multiple throttle conduits as the at least one equalization channel leads from the high capacity flow section to the throttle section.

2. The sleeve shaped valve cage according to claim 1, wherein the valve member is a valve plug of a control valve of a processing plant.

3. The sleeve shaped valve cage according to claim 1, wherein the processing plant comprises: a chemical plant, a food processing plant, or a power generating plant.

4. The sleeve shaped valve cage according to claim 1, wherein the high capacity flow section comprises:
at least one passage window for the increased flow rates.

5. The sleeve shaped valve cage according to claim 4, wherein the at least one passage window is rectangular having rounded corners.

6. The sleeve shaped valve cage according to claim 4, wherein a cross sectional area of a portion of the at least one equalization channel extending into the throttle section is less than an entire combined cross sectional area of the at least one passage window and the at least one equalization channel.

7. The sleeve shaped valve cage according to claim 6, wherein the portion of the at least one equalization channel extending into the throttle section is less than:
half,
a third,
between 5% and 20%, or
less than 1% of the entire combined cross sectional area of the at least one passage window and the at least one equalization channel.

8. The sleeve shaped valve cage according to claim 4, wherein the at least one equalization channel merges into the passage window with a rounded transition area.

9. The sleeve shaped valve cage according to claim 4, wherein the at least one passage window includes exactly one equalization channel.

10. The sleeve shaped valve cage according to claim 1, wherein the at least one equalization channel, in the displacement direction, forms a concave cavity cross section in the valve cage.

11. The sleeve shaped valve cage according to claim 1, wherein the at least one equalization channel extends in the displacement direction over at least a portion of the throttle section.

12. The sleeve shaped valve cage according claim 11, wherein the at least one equalization channel extends in the displacement direction over:
at least 1%, 5%, 10%, 15%, 25%, 50%, 75%, or 90% of the throttle section; or
at most 95%, 50%, 30%, or 10% of throttle section.

13. The sleeve shaped valve cage according to claim 1, wherein the multiple throttle conduits each define a round cross sectional area.

14. The sleeve shaped valve cage according to claim 1, wherein the valve cage comprises throttle conduits of a same shape and size in the throttle section.

15. The sleeve shaped valve cage according to claim 1, wherein the valve cage is integrally formed as a single piece.

16. A control valve for a processing plant, comprising a sleeve shaped valve cage according to claim 1 and a valve member received within the valve cage.

17. The sleeve shaped valve cage according to claim 1, wherein the valve cage is configured such that a stream of processing fluid enters the inside of the valve cage at an axial opening of the valve cage and exits the inside of the valve cage through the high capacity flow section and the throttle section.

18. A method for operating a control valve of a processing plant, the control valve comprises a valve cage and a valve member, the method comprising:
- guiding the valve member relative to the valve cage to control a stream of process fluid, from a closed position in which the valve member prevents streaming of the process fluid through the control valve into an open position in which the valve cage and the valve member together open an common orifice area for the stream of process fluid;
- while displacing the valve member from the closed position in a direction towards the open position, releasing a throttle section of the valve cage configured to allow pressure reduced flow rates of the process fluid through multiple throttle conduits that extend from an interior of the valve cage to an exterior of the valve cage, the throttle conduits being exclusively comprised within the throttle section;
- after the throttle section is released by the valve member, releasing a high capacity flow section of the valve cage configured to allow large flow rates of the processing fluid through the valve cage; and
- releasing, by the valve member, an equalization channel leading from the high capacity flow section into the throttle section before all throttle conduits are released by the valve member wherein the equalization channel extends between at least two adjacent throttle conduits of the multiple throttle conduits as the equalization channel leads from the high capacity flow section to the throttle section.

19. The method according to claim 18, wherein, while displacing the valve member from the closed position into the open position, the flow rate of the process fluid stream is continuously and strictly monotonously increased based on a control position of the valve member.

* * * * *